United States Patent [19]
Oeser

[11] 4,033,181
[45] July 5, 1977

[54] METHOD FOR DESTRUCTIONLESS PROOFING OF VISCOELASTIC PRODUCTS

[75] Inventor: Konrad Oeser, Hohr-Grenzhausen, Germany

[73] Assignee: Metzeler Gummitechnik GmbH, Edingen, Germany

[22] Filed: June 13, 1975

[21] Appl. No.: 605,249

[30] Foreign Application Priority Data

June 15, 1974 Germany .................. 2428992

[52] U.S. Cl. .............................................. 73/88 A
[51] Int. Cl.² ..................................... G01N 21/00
[58] Field of Search ............. 73/88 A, 100; 356/32, 356/109

[56] References Cited

UNITED STATES PATENTS

| | | |
|---|---|---|
| 3,828,126 | 8/1974 | Ramsey, Jr. ................. 73/88 A |
| 3,843,260 | 10/1974 | Edmonds ..................... 350/3.5 X |
| 3,868,185 | 2/1975 | Genzel et al. ................ 356/109 X |
| 3,911,733 | 10/1975 | Bhuta et al. .................. 73/88 A |

*Primary Examiner*—Jerry W. Myracle
*Attorney, Agent, or Firm*—Michael J. Striker

[57] ABSTRACT

A test specimen is composed of an elastic part and a viscoelastic part. The elastic part is braced against a support. The viscoelastic part is connected to the elastic part and pulled to deform the elastic part, and in so doing itself undergoes deformation. The deformation of the elastic-viscoelastic test specimen is limited by a fixed abutment against which the viscoelastic part comes to abut. The increase of deformation is at that time terminated. Thereafter, the viscoelastic part relaxes and creeps. During such relaxation and creeping a first and thereafter a superimposed second holographic photograph of the external surface of the elastic part or of the viscoelastic part are made. The time interval between the two exposures is selected in accordance with a preselected equation for purposes of reproducibility of the test.

11 Claims, 5 Drawing Figures

METHOD FOR DESTRUCTIONLESS PROOFING OF VISCOELASTIC PRODUCTS

The invention relates to a method for the non-destructive detection of inhomogeneities in bodies made of elastic or viscoelastic materials, e.g., crankshafts, synthetic plastic components, rubber-metal structural components, by means of holographic interferometry, with holographic photographs with coherent light being made of the external surface of the test specimen during different deformation conditions at different moments in time and evaluated, and an arrangement for performing the method.

With non-destructive testing by means of holographic interferometry (cf. in this connection "LASER", 1st edition, published 1972 Physik Verlag Weinheim, editors WEBER/HERZIGER and "Holografie als Messmethode", Dr. Rottenkolber, Werkstatt und Betrieb 1970, volume 3) one proceeded hitherto according to the known pressure chamber methods, according to which by means of pressure change there are brought into being in the test specimen two loading conditions and accordingly two deformation conditions which are then holographed and superimposed. In this way there are provided on the hologram interference lines which constitute a measure of the deformation and in the case of an abnormal pattern indicate a fault location or inhomogeneity in the test specimen. The practical application of holography in this area of technology is described further in "Holografie als Messmethode", Dr. ROTTENKOLBER, Werkstatt und Betrieb 1970, volume 3.

Furthermore, German Offenlegungsschrift 1,906,511 disclosed a method for testing pneumatic tires by means of holographic interferometry, according to which tires are first pumped up to a pressure at which they stretch still further, thereafter at two different moments in time holographic photographs of the outer surface of the tire are prepared and the resulting interference pattern is utilized for evaluation. It is to the disadvantage of the known method that when used in practice the establishment of a loading condition and the associated performance of exposures result in very long testing cycles and that as a result of loading or unloading or a marked dimension change of the tire volume occurring between the two exposure moments possibly a position change of the test body occurs which then produces false or inexact interference lines in the hologram.

These methods are furthermore defective, and not utilizable in practice in an economical manner, because they do not give repeatable and accurate test results, which are yielded if exact work-material-dependent guides are present for the moments for the exposures and the "depth ranges" needed for the evaluation. Accordingly, the method of Offenlegungsschrift 1,906,511 can only give a general idea of how such a method is to be performed.

However, for actual practice, there is needed a rule dependent upon the material involved, to make it possible to perform tests in series under corresponding conditions and with a rule actually giving correct results. In particular there is the need to be able to so exactly set the moment of the first exposure and the moment of the second exposure in dependence upon the selection of material involved that the corresponding interference pattern reproduces a depth or height range within which inhomogeneities constituting flaw locations or inexact production methods can be recognized.

Now it has been surprisingly found that, particularly with elastic (e.g., steel crankshafts) and also with viscoelastic construction materials, such as for example present in rubbermetal components, the use of two loading conditions for testing with holographic interferometry can be dispensed with, by using the phenomenon of the relaxation of the viscoelastic material.

With a single fixed value deformation of the eleastic component of the viscoelastic testing spring and two holographic photographs of the component to be tested (either the elastic component or the viscoelastic test spring itself), in the condition of the relaxation of the viscoelastic test spring there becomes possible an essentially more exact simpler and repeatable testing than as afforded by the prior art.

The inventive method is characterized in that the test specimen prior to the moment of the first exposure is subjected to a deformation set to a single fixed value by means of abutment limitation and then, during the relaxation or creep of the viscoelastic test spring, holographic photographs are made of the external surface of the test specimen at moments the interval between which (exposure interval) is determined by a formula.

If using the inventive method the elastic component of the test specimen is to be subjected to a testing, it is important that the testing spring, made of viscoelastic material, pull on the part of the test specimen made of elastic material; at the other end of the testing spring the two parts of the test specimen, by means of a stress application member guided to an abutment, are subjected to a deformation lying far below their breaking elongation limits; after the oscillations resulting from the loading operation have died away, the first exposure of the external surface of the elastic part of the test specimen is made and thereafter, during the relaxation of the viscoelastic testing spring, after a time interval established by a formula, the second such exposure is made, before the test specimen is unloaded.

On the other hand, if the viscoelastic testing spring itself is to undergo a testing, it is necessary that the rubbermetal component between the elastic test specimen part, which then is designed to be a rigid support relative to the rubbermetal component, and the stress applying member, which is movable and guided to an adjustable abutment, be subjected to a deformation lying far below its breaking elongation limit; after the dying away of the oscillations produced by the deformation operation, the first exposure, and thererafter at the end of the time interval determined by the formula, the second exposure of its external surface is performed, and only thereafter is the testing spring unloaded.

In order to be able to avoid protracted tests for each individual test specimen, it is of particular significance according to a further concept of the inventive method, that when testing the elastic part of the test specimen the exposure interval between the holographic exposures should amount to:

$$\Delta t = \left(10 \exp \frac{(n+1)\Delta f}{\epsilon(h_1 - h)} - 1\right) t,$$

where $n$ represents the ratio of the stiffness of the elastic part and of the viscoelastic testing spring, $\Delta f$ the shape change of the elastic specimen, $\epsilon$ the relaxation constant or creep constant of the material of the viscoelastic testing spring; $h_1$ the height of the deformed viscoelastic testing spring and $h$ the height of the undeformed testing spring and $t$ the time for the drying away of the oscillations produced by the performed loading operation up to the first exposure.

If on the other hand the viscoelastic testing spring is to undergo a testing, then one starts from the assumption that the elastic part of the test specimen, compared to the stiffness of the testing spring, has a stiffness which goes to infinity. According to this, the exposure interval between the holographic exposures of the external surface of the viscoelastic part of the test specimen is obtained from the following equation:

$$\Delta t = \left(10 \exp \frac{\Delta q}{\epsilon \cdot q_1} - 1\right) t,$$

where $\Delta q$ represents the change of the transverse contraction or transverse stretching of the viscoelastic part of the test specimen; $\epsilon$ the relaxation or creep constant of the material of the viscoelastic testing spring and $q_1$ half the transverse contraction or elongation of the viscoelastic part of the test specimen.

With elastic materials, e.g., a steel crankshaft, it is likewise possible to determine the quality of the test specimen, or the lack of quality, from the interference pattern formed on the external surface with a loading or a gradual loading condition.

Further inventive method features as well as in part the arrangement for performing the method are to be derived from the appended dependent claims.

For a long time there was sought a possibility of non-destructively testing elastic and/or viscoelastic materials, with a method being fit for practice only if it is such that each individual manufacture component can be examined in a short cycle. The fault locations or inhomogeneities in these components are based, according to experience, upon air pockets, shrinkage voids, cracks formed during heat-treatment or hardening, structural anomalies or caverns in the material, in the case of viscoelastic components non-uniformly mixed rubber or varying elasticity moduli, as well as moderate or bad adhesion regions between the metal and the rubber or even direct adhesion flaws, the tracking down of which was the object of the invention.

Assuming that these flaws in the case of a loading of the structural component extend outwards to its external surface, a sufficiently exact measuring method is needed by means of which the inhomogeneities are determinable and depictable. For the measuring method use is made of holographic interferometry based upon the LASER principle. A plurality of holographic photographs can be made which then, similar to the contour lines of a cartographic representation, spatially register and reproduce external surface movements in the smallest depth ranges. If now real inhomogeneities are contained in the test specimen then these interference patterns do not extend in accordance with known and regular laws; instead there are formed spatial regions which produce in the image a concentration or disintegration of the interference pattern and accordingly constitute a clear indication of irregularities concealed therebeneath.

In the case of polymers or viscoelastic materials, one is familiar with the term relaxation, which means that the stress in a polymer which has once been stretched or compressed by a certain amount thereafter changes during a computable time interval. During this time interval, not only the stress in this test specimen but also the elongation and accordingly the external surface changes, i.e., a test specimen loaded with a single definite deformation of its height changes its shape during this time interval of relaxation. Its external surface accordingly moves away from or toward a photographic plate arranged at a fixed distance from the test specimen. When using coherent light, i.e., light of a certain wavelength emitted from a LASER, interference lines are formed on this photographic plate.

This phenomenon of relaxation of viscoelastic materials can be utilized also for the testing of elastic test specimens, such as for example steel crankshafts, or workpieces made of synthetic plastic material, by subjecting these parts in the testing arrangement, via a viscoelastic testing spring, to a loading and in consequence of its relaxation in the case of a single selected fixed value of a loading nevertheless experience a changing loading with a shape change; the holographic photographs at two different moments dependent upon the relaxation of the viscoelastic testing spring form an interference pattern which provides an indication of any fault locations or inhomogeneities. In this way the elastic part of the test specimen is considered to be a component of finite stiffness which, due to the loading on the side of the viscoelastic testing spring is deformed and testable.

The method will be described below with respect to FIGS. 1 to 4.

Figure 1:
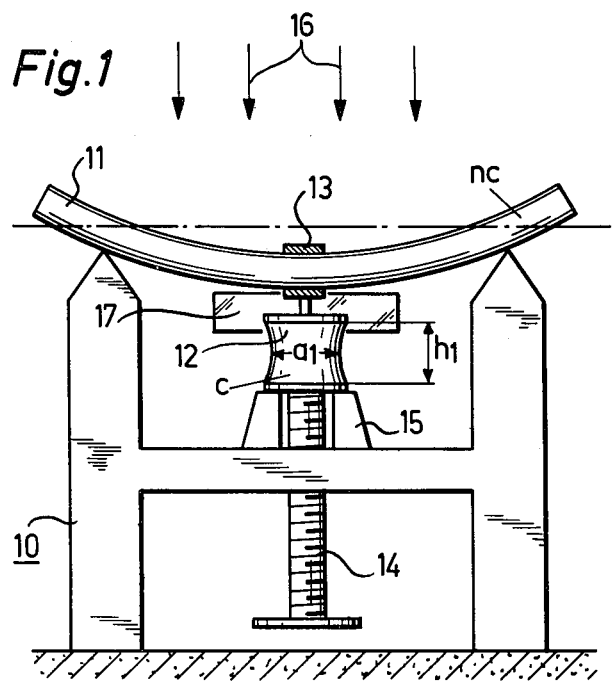
FIG. 1 is a drawing of the arrangement when testing the elastic part of the test specimen.

In FIG. 1, a test specimen, composed of a shaft 11 made of elastic material, e.g., steel, and a testing spring 12 made of a viscoelastic material, e.g. rubbermetal, is held in a testing and stressing arrangement 10. The shaft 11 has a stiffness $nc$, whereas the testing spring 12 has a stiffness $c$. The testing spring 12 pulls on the one hand on the shaft 11 via a pulling eye 13, whereas at its lower side it is connected with a spindle 14 which is screwable in the arrangement 10. Associated with the lower side of the testing spring 12 are rigid abutments 15 which limit the movement effected by the spindle 14. In the illustrated position, the shaft 11 is bowed under load by a tensile stressing of the testing spring 12 to the abutments 15, with the testing spring having a height $h_1$ and a diameter $a_1$.

In FIG. 1, the shaft 11 is tested for inhomogeneities, for which purpose the direction of the beams of coherent light to be directed to the external surface of shaft 11 are advantageously oriented parallel to the deformation direction, i.e., the longitudinal axis of the spindle 14 (arrow 16).

In order to be able to evaluate the entire external surface of the shaft 11 at one time, there is provided a W-shaped deflecting mirror 17 which projects the coherent light from all sides onto the external surface of the shaft and collects the light reflected from the external surface, orients it and projects it onto the non-illustrated recording plate.

Thereafter, the spindle 14 is screwed back upward, the shaft 11 removed and in its place a new component to be tested inserted.

Figure 1A:
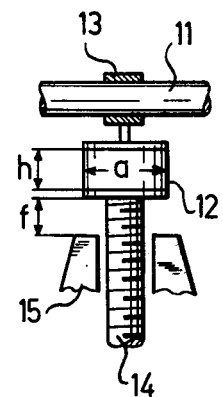
FIG. 1a depicts a portion of the set-up of FIG. 1 at the start of the testing procedure.

The starting conditions is indicated in FIG. 1a in which the shaft 11 is still straight and the testing spring 12 still not elongated. In this condition it has a height $h$ and a diameter $a$; its lower side is located opposite the abutments 15 with a spacing $f$.

The testing proceeds as follows:

The deformation of the testing spring is begun and brought to a value limited by the abutments 15, as a result of which the shaft experiences a bending under load. Thereafter, one waits for a first time interval $t_1$, until the oscillations produced by the loading have died away. After the limited loading in the testing spring is established, the latter finds itself in the state of its relaxation, i.e., in the viscoelastic material over a long time after the moment of effecting the loading both the stress and also the transverse strain change. The material creeps and also relaxes, so that the bending under load of shaft 11 gradually becomes smaller without any external influence.

After the time $t_1$, a first holographic photograph of the outer surface of the shaft is made and after the elapse of an interval $\Delta t$ a second photograph is made, which then superimposed show the interference pattern produced by the stretching of the shaft.

Figure 2:
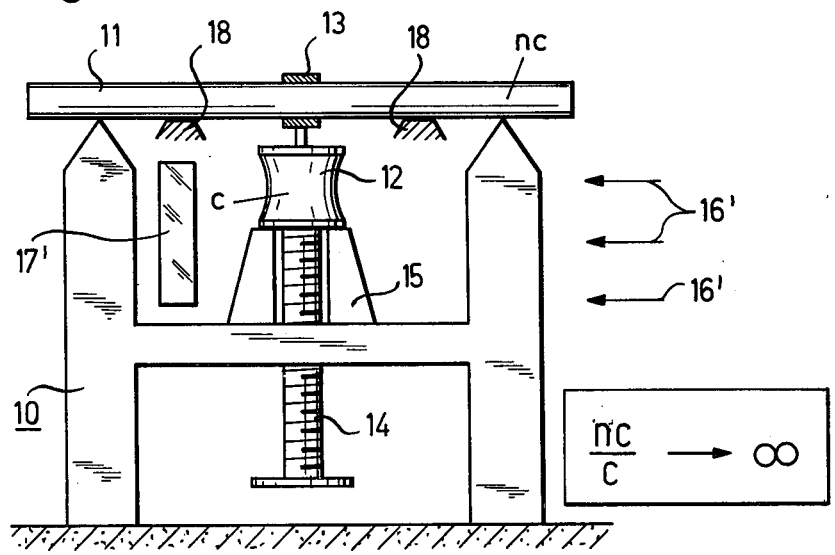
FIG. 2 is a drawing when testing the viscoelastic testing spring.

FIG. 2 shows the testing of the testing spring 12, with either the shaft 11 already having a stiffness $nc$ going to infinity compared to the stiffness $c$ of the testing spring or being made so stiff by means of supports 18 that no or only a negligible shape change occurs in it. Due to the relaxation of the testing spring 12, after the moment $t_1$, besides the change of the stretching force in the viscoelastic material, there also sets in an external surface change of the testing spring which can be registered by means of two holographic photographs in the exposure time interval $\Delta t$ by means of the formed interference pattern and be evaluated. However, for this, the incidence direction of the coherent light (arrow 16') is selected in a plane normal to the loading direction and for panoramic display the deflecting mirror by 90° (position 17'). After the second photograph the testing spring 12 is unloaded and removed.

With this procedure, it is possible to perform both a separate testing of the two test components as well as a combined testing; after the first loading case unloaded and the observation direction as well as the deflection mirror are turned, after which after renewed loading the second part of the test sample is evaluated.

Self-evidently the method can also be performed with pressure loading or other loading types of the testing spring, such that the phenomenon of the relaxation of the viscoelastic material occurs.

Because the total testing cycle is composed of the time $t_1$ (time interval between the fixing of the test specimen and the first exposure) and the exposure interval $\Delta t$, an economical method for practice can be produced only if the time $t_1$ is kept small. This can advantageously be achieved by means of an automatic arrangement and by the selection of a sufficiently light-intensive laser, and the exposure interval can be kept small too.

As an example of use of the method, the method is described below using a continuous argon laser.

With a polymer having an average $\epsilon$ of 0.03, an average transverse contraction of $\Delta q = 2\ m\mu$ (which in the case of an argon laser corresponds to a range of at most eight interference lines, since its wave length amounts to about 0.5 $m\mu$), there follows according to the inventive formula $$\Delta t/t_1 \cong 0.1.$$

Because on the one hand the setting-up of the stressed test specimen produces oscillations in the arrangement, which must die away prior to the first exposure, and because on the other hand when inserting and stressing the test specimen some time is consumed, and finally because a sufficient time is needed for assessing the image, which is possibly projected onto a television screen, a time $t_1$ of less than 6 seconds until the first exposure can scarcely be realized. As a result, an exposure interval $\Delta t$ of 0.6 seconds is calculated, which then requires a respective exposure time of at most 0.06 seconds. So short an exposure time can be produced only by a light-intense laser, e.g., an argon laser. The total testing time accordingly amounts to $t_1 + \Delta t$, i.e., 6.6 seconds.

With so fast-operating an arrangement, according to the described method with one arrangement a yearly number of 1.5 million parts can be non-destructively tested, with the fractional costs per test being in the range below 0.1 DM per test.

Figure 3:
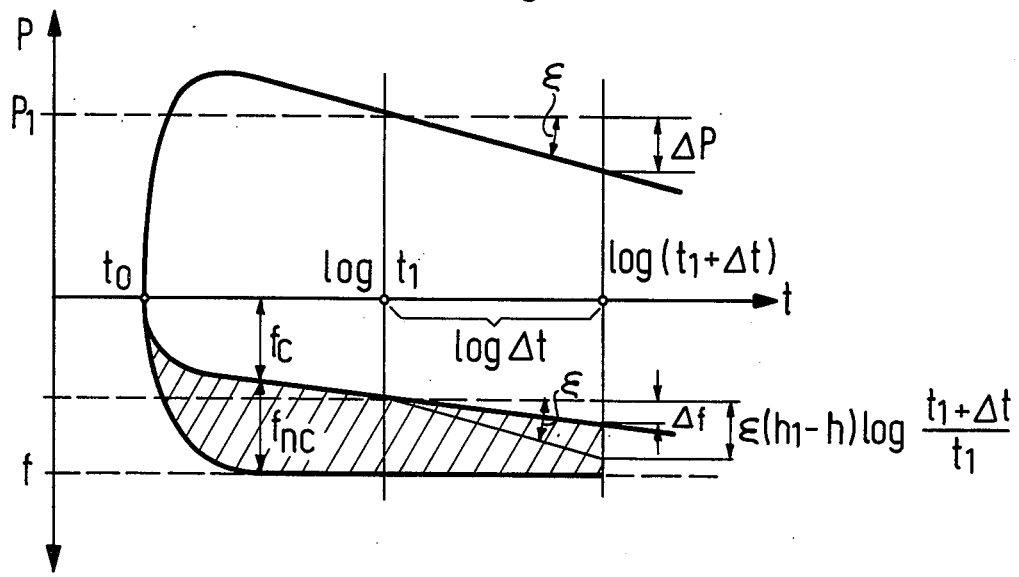
FIG. 3 is a logarithmic testing diagram for FIG. 1.

FIG. 3 depicts in the form of a logarithmic graph a testing cycle for the shaft 11, with time being plotted (logarithmically) along the horizontal axis and loading (P) and deformation ($f$) of the test specimen being plotted along the two vertical axes. $t_1$ is the time interval until the dying away of the oscillations produced by the loading operation, $\Delta t$ the exposure interval for the two holographic exposures. The shape of the force line indicates that the initially applied force has decreased to $P_1$ at moment $t_1$ and then decreased still further along a straight line due to relaxation, so that after the exposure interval $\Delta t$ it lies below $P_1$ by an amount $\Delta P$, with the decrease of the force line being a measure of the relaxation or creep constant of the viscoelastic material.

In the lower part of the graph, there are indicated the deformations of the testing spring (upper curve) and of the elastic test body (lower curve); with increasing relaxation the extent of the deformation $f_c$ of the testing spring increases in the manner in which the extent of the deformation $f_{nc}$ of the shaft decreases. Accordingly, in the exposure interval $\Delta t$ the deformation $\Delta f$ has increased. The drop of the shaded relaxation constant $\epsilon$ towards the horizontal axis, at the end of the exposure interval $\log (t_1 + \Delta t)$, has the magnitude $$= \epsilon(h_1 - h) \log \frac{t_1 + \Delta t}{t_1}.$$

From this it follows that:

$$\Delta P = nc \cdot \Delta f = c \left[ \epsilon(h_1 - h) \log \frac{t_1 + \Delta t}{t_1} - \Delta f \right]$$

or $$(n + 1)\Delta f = (h_1 - h) \log \frac{t_1 - \Delta t}{t_1}.$$

The exposure interval resulting accordingly amounts to $$\Delta t = \left( 10 \exp \frac{(n+1)\Delta f}{\epsilon(h_1 - h)} - 1 \right) t_1.$$

Assuming that the stiffness of the shaft relative to the stiffness of the testing spring goes to infinity, $\Delta f$ decreases to zero. Then the testing spring itself becomes the test specimen and a $\Delta f$ no longer appears. For this a transverse stretching change $\Delta q$ predominates which is utilizable for the holographic photographing of the testing spring external surface with turned observation direction.

Figure 4:
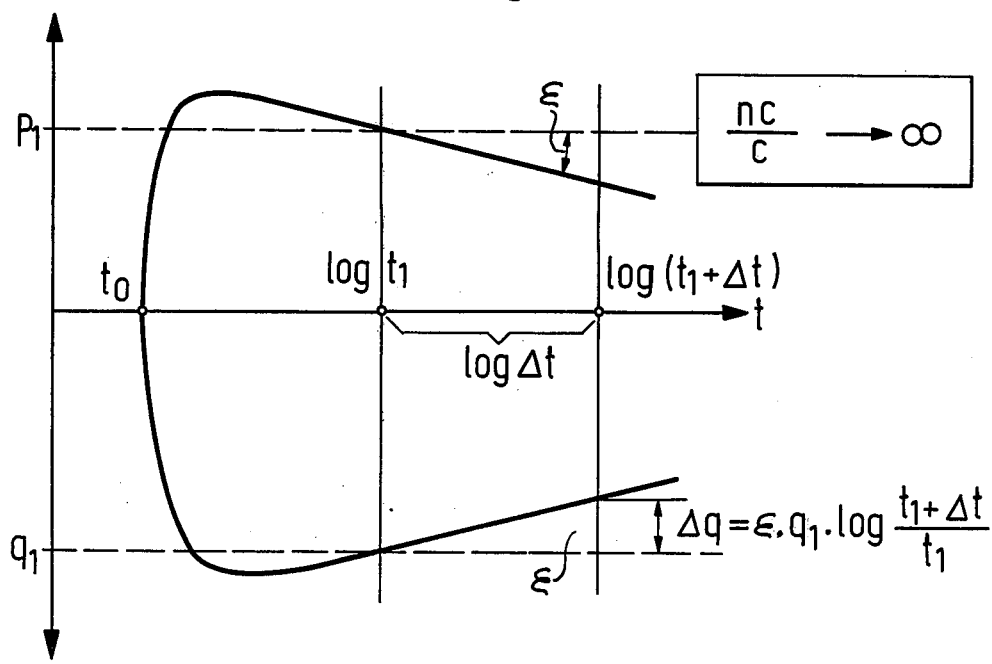
FIG. 4 is a logarithmic testing diagram for FIG. 2.

The testing operation here is depicted by FIG. 4, with only the lower part of the graph being changed by plotting the transverse deformation $q_1 = (a - a_1)/2$ along the vertical axis. After the moment log $t_1$ it decreases following a straight line with the drop $\epsilon$, until after the exposure interval log $\Delta t$ a difference $$\Delta q = \epsilon q_1 \log \frac{t_1 + \Delta t}{t_1}$$

has developed.

From the above derived formula the exposure interval $\Delta t$ can be calculated and it amounts to:

$$\Delta t = \left( 10 \exp \frac{\Delta q}{\epsilon q_1} - 1 \right) t_1.$$

I claim:

1. A method of forming holographic interferograms for the non-destructive detection of inhomogeneities in bodies made of elastic and viscoelastic materials, including crankshafts, synthetic plastic components, rubber-metal structural components, and the like, the method comprising the steps of subjecting a test specimen at least part of which is made of viscoelastic material to a predetermined deformation, during the continuance of such deformation allowing the viscoelastic part of the test specimen to relax and creep, and during such relaxation and creeping forming the holographic interferogram by forming a first holographic photograph of at least part of the external surface of the test specimen at a first exposure moment and then after the elapse of a predetermined time interval and still during such relaxation and creeping forming at a second exposure moment a second holographic photograph superimposed upon the first.

2. The method of claim 1, wherein the step of subjecting the test specimen to a predetermined deformation comprises increasing the deformation of the test specimen from zero, positioning a fixed abutment in the path of the test specimen undergoing deformation, and when the test specimen undergoing deformation comes to abut against the fixed abutment terminating the increase in the deformation applied from the outside of the test specimen.

3. The method of claim 2, using as the test specimen the combination of a body of elastic material and a body of viscoelastic material, the step of subjecting the test specimen to a predetermined deformation comprising connecting the body of viscoelastic material to that of elastic material and using the former as a viscoelastic testing spring, deforming the body of elastic material by stressing the viscoelastic testing spring until the viscoelastic testing spring comes to abut against the fixed abutment, then allowing the oscillations produced by the loading operation to die away so that the elastic material will be subjected only to the force variation of the viscoelastic testing spring while under tension, thereafter forming the first holographic photograph of the external surface of the body of elastic material and after the elapse of the predetermined time interval forming the second holographic photograph of the external surface of the body of elastic material.

4. The method of claim 3, wherein the step of subjecting the test specimen to the predetermined deformation comprises moving a stress-applying member connected to the test specimen in a predetermined direction to effect deformation of the test specimen, and wherein the step of forming the holographic photographs comprises utilizing for the formation of such photographs an observation direction oriented parallel to the direction of movement of the stress-applying member.

5. The method of claim 1, the test specimen being a viscoelastic body, connecting one end of the viscoelastic body to a support and stressing on the other end of the viscoelastic body until such other end comes to abut against the fixed abutment, allowing the oscillations produced by the application of stress to die away, and thereafter forming the first and second holographic photographs of the external surface of the viscoelastic body.

6. The method of claim 5, the predetermined time interval being $$\Delta t = \left( 10 \exp \frac{\Delta q}{\epsilon q_1} - 1 \right) t_1,$$

wherein $\Delta q$ is the change of the transverse contraction or transverse expansion of the viscoelastic body, wherein $\epsilon$ is the creep constant of the material of the testing spring, and wherein $q_1$ is one half the transverse contraction or transverse expansion of the body of viscoelastic material.

7. The method of claim 6, wherein the exposure time for both holographic exposures is at most one tenth of the predetermined time interval $\Delta t$.

8. The method of claim 5, wherein the step of subjecting the viscoelastic test specimen to the predetermined deformation comprises moving a stress-applying member connected to the viscoelastic test specimen in a predetermined direction to effect the desired deformation of the viscoelastic test specimen, and wherein the step of forming the holographic photographs comprises utilizing in the formation of such photographs an observation direction lying in a plane oriented normal to the direction movement of the stress-applying member.

9. The method of claim 1, the predetermined time interval being $\Delta t$ and determined by the following formula:

$$\Delta t = \left( 10 \exp \frac{(n+1)\Delta f}{\epsilon(h_1 - h)} - 1 \right) t_1,$$

wherein $n$ signifies the ratio of the stiffness of the elastic to the viscoelastic parts of the test specimen, wherein $\Delta f$ is the shape change of the elastic part of the test specimen, wherein $\epsilon$ is the creep constant of the material of the viscoelastic part of the test specimen, wherein $h_1$ is the height of the viscoelastic part deformed, wherein $h$ is the height of the viscoelastic part undeformed, wherein $t_1$ is the time for the damping down of the oscillations resulting from the performance of the deformation until the first exposure moment.

10. The method of claim 9, wherein the exposure time for both holographic exposures is at most one tenth of the predetermined time interval $\Delta t$.

11. The method of claim 1, wherein the exposure time for both holographic exposures is at most one tenth of the predetermined time interval $\Delta t$.

* * * * *